UNITED STATES PATENT OFFICE.

FRANCIS E. GALLAGHER, OF NEWTON, MASSACHUSETTS, ASSIGNOR TO STANDARD ALCOHOL COMPANY, OF NEW YORK, N. Y., A CORPORATION OF MAINE.

PROCESS OF PRODUCING FERMENTABLE SUGARS.

1,091,327.  Specification of Letters Patent.  Patented Mar. 24, 1914.

No Drawing.  Application filed July 15, 1912. Serial No. 709,565.

*To all whom it may concern:*

Be it known that I, FRANCIS E. GALLAGHER, a citizen of the United States, residing at Newton, in the county of Middlesex and State of Massachusetts, have invented certain new and useful Improvements in Processes of Producing Fermentable Sugars, of which the following is a specification.

This invention relates to the production of fermentable sugars from ligno-cellulose or other cellulosic raw material.

It is well known that certain constituents of such cellulosic raw materials as sawdust, wood-waste, etc., are convertible, in presence of dilute acids or suitable hydrolyzing agents, into fermentable sugars. The cooking or digesting of the material is preferably effected in closed digesters by the direct action of steam under suitable pressure, and may be performed under any suitable conditions. The cooked mass is then extracted with water, preferably in a diffusion apparatus, and the extract is neutralized, fortified with nitrogenous material, seeded with yeast, fermented and distilled for the production of alcohol. The above steps may be carried out in any manner known to the art. The liquid residue of the distillation is known in the art as "spent wort" or "slop," and contains in solution a variety of substances derived from the original ligno-cellulose by hydrolysis. Thus the slop may contain: (1) Bodies which are not directly fermentable and are not convertible by hydrolysis into fermentable substances. (2) Bodies which, while not directly fermentable, are convertible by hydrolysis into fermentable substances,—so-called wood-dextrins. (3) Decomposition products of dextrose. I have found that a substantial increase in the yield of alcohol from the original ligno-cellulose may be obtained by subjecting this slop to further hydrolysis. However, since the hydrolyzable constituents of the slop consists principally, if not exclusively, of dextrin-like bodies, herein referred to as wood-dextrins, it is found essential for the best results, to modify somewhat the conditions which are applicable to the hydrolysis of the original ligno-cellulose.

Excellent results have been secured by proceeding as follows: An amount of hydrolyzing acid, say sulfuric or hydro-chloric acid, equivalent to about two per cent. by weight of the sawdust to be digested, is diluted by adding thereto a suitable proportion of slop, and this acidified slop is mixed with the ligno-cellulose and the whole submitted to a process of digestion or cooking. The slop may be somewhat concentrated if desired, either before or after the addition of the acid, and is preferably added in the proportion of ten to fifteen per cent. of solids in the slop by weight of the dry ligno-cellulose, although a larger or smaller percentage may be used. The digestion is best performed under moderate pressure of steam, sixty to ninety pounds per square inch having been found suitable. By proceeding in this manner, an extract may be obtained which contains fermentable constituents derived both from the ligno-cellulose and from the slop.

Inasmuch as the slop contains considerable quantities of calcium compounds and other constituents which are capable of reacting with or neutralizing sulfuric acid, it is desirable to add to the slop a materially larger quantity of acid than would suffice for the hydrolysis of the ligno-cellulose alone. For example, an addition of one-half to one per cent. of sulfuric acid by weight of ligno-cellulose is sufficient to bring about a vigorous hydrolysis under proper temperature conditions, but when the slop is used as a diluting medium for the acid, the proportion of acid used may advantageously be increased to one and one half to three per cent. by weight of the ligno-cellulose. The amount of acid added should in all cases be such that there remains a substantial excess of free hydrolyzing acid, after the calcium-organic salts of the slop have been decomposed.

In some cases it is desirable to subject the ligno-cellulose to digestion at a temperature higher than is best suited for the slop, and in such cases the procedure may be correspondingly modified. For example, the slop, suitably acidified, may be boiled or heated by itself, or admixed with the extract from the digested ligno-cellulose, or the slop may be returned to any suitable stage of the process where it will be subjected to a temperature sufficient to convert the wood-dextrins into fermentable bodies. For instance, the acidified slop may be introduced into the diffusion battery, or into the settling or evaporating pans, or in general into any stage of the process where hydrolysis will occur under the existing temperature conditions. In case the digestion takes place at successive higher and lower temperatures, as described in my prior Patent No. 1,056,161, patented March 18, 1913, the slop may be advantageously introduced into the digester during the second or lower-temperature stage of the digestion.

I claim:

1. In a process of producing fermentable sugars from ligno-cellulose or other cellulosic raw material, the step which consists in subjecting the spent wort to a further hydrolytic treatment.

2. In a process of producing fermentable sugars from ligno-cellulose or other cellulosic raw material, the step which consists in subjecting the spent wort, in admixture with cellulosic raw material, to a further hydrolytic treatment.

3. In a process of producing fermentable sugars from ligno-cellulose or other cellulosic raw material, the step which consists in subjecting the spent wort, in admixture with the soluble products resulting from the hydrolysis of the cellulosic raw material, to a further hydrolytic treatment.

In testimony whereof I affix my signature in presence of two witnesses.

FRANCIS E. GALLAGHER.

Witnesses:
  ARTHUR D. LITTLE,
  AMY MONTGOMERY.